Figure 1:
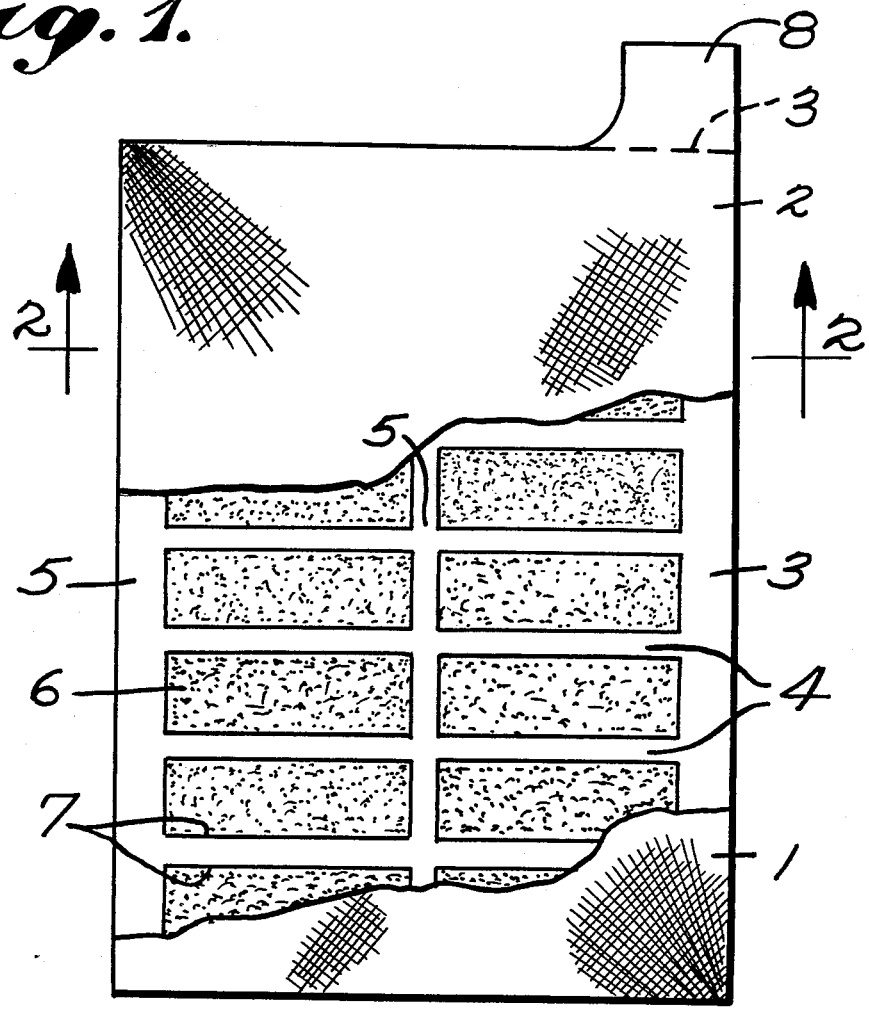
Figure 2:
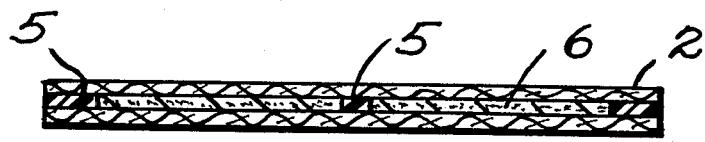

United States Patent [19]

Muller et al.

[11] Patent Number: 4,749,635
[45] Date of Patent: Jun. 7, 1988

[54] PLATE ELECTRODE COMPRISING METALLIC COVERING FOR ALKALINE ELECTROCHEMICAL ELEMENTS AND PROCESS FOR ITS PRODUCTION

[76] Inventors: Max Muller, Fadackerstrasse 6, CH-8305 Dietlikon, Switzerland; Heinz Kolling, Sulzburgstrasse 62, 5000 Koln 41, Fed. Rep. of Germany

[21] Appl. No.: 754,494
[22] PCT Filed: Oct. 26, 1984
[86] PCT No.: PCT/CH84/00171
§ 371 Date: Aug. 26, 1986
§ 102(e) Date: Aug. 26, 1986
[87] PCT Pub. No.: WO85/02064
PCT Pub. Date: May 9, 1985

[30] Foreign Application Priority Data

Oct. 26, 1983 [CH] Switzerland ............ 5801/83

[51] Int. Cl.⁴ .................. H01M 4/24; H01M 4/76
[52] U.S. Cl. ................... 429/234; 429/239; 429/241; 429/245
[58] Field of Search ............ 429/234, 239, 233, 237, 429/241, 242, 245

[56] References Cited

U.S. PATENT DOCUMENTS

| | | | |
|---|---|---|---|
| 2,251,913 | 8/1941 | Brennan | 429/234 X |
| 3,023,262 | 2/1962 | Emmerling et al. | 429/233 |
| 3,560,262 | 2/1971 | Baba et al. | 429/234 X |
| 4,221,854 | 9/1980 | Hammar et al. | 429/243 X |
| 4,223,081 | 9/1980 | Faber | 429/234 |
| 4,237,205 | 12/1980 | Matter | 429/234 |
| 4,356,242 | 10/1982 | Doniat | 429/234 |
| 4,439,916 | 4/1984 | Faber | 429/234 X |

FOREIGN PATENT DOCUMENTS 2347790 11/1977 France.

Primary Examiner—Anthony Skapars
Attorney, Agent, or Firm—Cushman, Darby & Cushman

[57] ABSTRACT

In this plate electrode for use in alkaline electrochemical elements or disposable batteries and accumulators, the cover-walls are formed by two metal fabric pieces (1, 2) of plate size. A netting (3), made of thermoplastic material, is located in between. The netting apertures form squares (7) for receiving the active composition (6). In production, the plate, constructed in this way, is compressed over the whole surface under the influence of heat, so that the metal fabric pieces are fused into the plastic netting. The active composition is compressed at the same time. The metal fabrics consist of uniform wire material, especially of nickel. In comparison with conventional pocket plates comprising pockets produced or assembled from perforated metal sheet, the present plate electrode possesses advantages with respect to its quality features and production costs.

3 Claims, 1 Drawing Sheet

U.S. Patent

Jun. 7, 1988

4,749,635

PLATE ELECTRODE COMPRISING METALLIC COVERING FOR ALKALINE ELECTROCHEMICAL ELEMENTS AND PROCESS FOR ITS PRODUCTION

The invention relates to a plate electrode comprising a metallic covering which is intended for use in alkaline electrochemical elements, such as, for example, nickel/cadmium accumulators.

In comparison with plate electrodes for acidic electrochemical elements, for example lead accumulators, the coverings differ both with respect to the material and, abov all, with respect to workability and form (metal fabrice).

The cover-walls of known pocket plates of this type consist usually of perforated metal sheet, for example, of nickel-plated sheet iron. The mostly elongated pockets are produced individually from perforated metal strips and, when the active composition has been filled and closure has been effected by mutual attachment at the longitudinal edges, —for example, by interlocking seams, —are assembled to form a pocket plate. The pockets which are located horizontally above one another, as a rule, are joined by metal borders at the side edges of the pocket plate and a metal crosspiece, comprising a conduction lug, joins the lateral metal borders at the upper edge of the pocket plate.

The production of this type of pocket plate is rather costly owing to the numerous operations, both as regards the mechanical equipment required and the volume of work. It is well-known, however, that pocket plates of this type also have qualitative shortcomings, for example, low utilisation of composition, high internal resistance, high transition resistance between active composition and electrolyte, inadequate conduction of the current of the conduction lug and low power to weight ratio, by comparison with other electrode types, for example, sintered plates.

French Pat. No. A 2,347,790, in the name of VARTA Batterien AG, Federal Republic of Germany, of Nov. 4, 1977, claims alkaline electrochemical elements. All that is being said about the positive electrodes is that the positive composition is enclosed under pressure in a metallic fabric, preferably nickel fabric. Nothing further is specified regarding the design and/or production of the electrode mentioned.

The object of the invention is to provide a plate electrode, suitable for the purpose indicated, which is easier and cheaper to produce than conventional pocket plates and sintered plates and possesses improved quality features by comparison with the latter, particularly by comparison with pocket plates.

The invention also relates to a process for the production of this type of plate electrode.

Owing to the use of metal fabrics in place of perforated metal sheet for the cover-walls, the passage crosssection per unit area can be increased approximately threefold and more. This makes better utilisation of the active composition possible and leads to a lower transition resistance between active composition and electrolyte. This also achieves a higher discharge voltage. The current is conducted directly to the conduction lug via the wires of the metal fabric pieces, that is to say, independently of the orientation of the pasted squares, which disposes of the transition resistances, which are inevitable in the case of known pocket plates and frequently change with time, between the pockets and the metal borders. This results in a lower internal resistance whose magnitude, moreover, remains virtually constant. Besides, no metal borders are required.

The metal fabric pieces consist preferably of uniform uncoated wire material, for example of nickel wire. This avoids contamination of the active composition with iron, which occurs on the known pocket plates comprising cover-walls made of nickel-plated sheet iron, and results in an increase in the cycle durability.

Since metal fabric is lighter than perforated metal sheet, a reduction in weight and therefore a higher power to weight ratio of the electrochemical elements, equipped with it, can also be achieved by means of the plate electrode according to the invention.

The plate electrode according to the invention is much easier to produce and with less expensive means, since there is no prefabrication and assembly of individual pockets. In practice, it can be produced in one operation. Furthermore, there is the possibility of producing plate electrodes from two metal fabric webs and one plastic netting web by the endless method and to separate them in the pressed and fused state, which leads to a considerable reduction in the production costs.

An exemplary embodiment of the plate electrode according to the invention is shown in the drawing. For the better illustration of its construction, the mutually superimposed material layers have been partially exploded in the representation.

The cover-walls of this plate electrode are formed by two metal fabric pieces 1 and 2 of plate size. A netting 3, made of thermoplastic material, is located in between, its netting appertures forming squares 7, delimited by bars 4 and crosspieces 5 and containing the active composition 6. The metal fabric pieces 1 and 2 are fused into the plastic netting 3 in a manner not shown in detail, so that the pasted squares 6 are enclosed on all sides. The conduction lug 8 is formed by extensions of the metal fabric pieces 1 and 2 which can be welded either directly together or with part of a grounding interposed. The metal fabric pieces 1 and 2 and the plastic netting 3 have identical external dimensions, except for the plastic-free conduction lug 8. The number, shape, size and orientation of the pasted squares 7 and therefore the arrangement of the bars 4 and of the optionally existing central crosspieces 5 of the plastic netting 3 depend, above all, on the size and the format of the plate electrode. Instead of having angular shape, the pasted squares can also be round, so that round composition disks, produced in a conventional manner, can be employed.

The plastic netting 3 consists, for example, of polyethylene, polypropylene, polyvinyl chloride or polystyrene and is either punched out of film material or produced by injection moulding.

The active composition can be present in powder form, as paste or in tablet form. Tablets are the most suitable regarding uniform dosage and density of the composition and are also best for handling in the production of the plate electrode.

In the production of the plate electrode described, the plastic netting 3 is first placed on a metal fabric piece 1 and the active composition 6 is then introduced into the netting apertures or squares 7. A second metal fabric piece 2 is placed on top. The entire plate stack in then compressed over the whole surface under the influence of heat, so that the metal fabric pieces 1 and 2 are fused into the plastic netting 3. At the same time, the active composition 6 is compressed, —even more so in the case of tablets. The heat required can be generated, for example, by means of ultrasonic waves. The compression pressure has to be sufficiently high for the metal fabric pieces to be properly joined together, on the one hand, and, on the other hand, for the active composition to be compressed to an adequate extent.

Plate electrodes having very low thickness, —1 mm and less, —can be produced in the described manner. A further advantage of the plate electrode according to the invention is that recycling can be performed with much less labour than is the case with conventional pocket plates.

We claim:

1. Plate electrode for use in an alkaline environment comprising: two metal fabric pieces each constructed of uncoated metal wires and each having the size of the desired plate electrode, said metal fabric pieces forming cover walls of said electrode, a netting made of thermoplastic material located between said metal fabric pieces, the apertures in said netting containing active material and said netting and said fabric pieces being heat-and-pressure fused together, with said apertures being closed on all sides and said active composition being compressed in situ in said apertures.

2. Plate electrode as in claim 1 wherein each of said metal fabric pieces has an extending part, the extending parts of the two fabric pieces being generally coextensive with each other and welded together to form a conduction lug, said extending parts being free of thermoplastic netting therebetween.

3. Plate electrode as in claim 1 wherein the wire material is nickel.

* * * * *